(12) United States Patent
Desjardins

(10) Patent No.: US 9,944,399 B2
(45) Date of Patent: Apr. 17, 2018

(54) SEAL ASSEMBLY FOR A BEARING ASSEMBLY IN A GAS TURBINE ENGINE

(71) Applicant: Pratt & Whitney Canada Corp., Longueuil (CA)

(72) Inventor: Michel Desjardins, St. Hubert (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 604 days.

(21) Appl. No.: 14/454,064

(22) Filed: Aug. 7, 2014

(65) Prior Publication Data

US 2016/0040544 A1 Feb. 11, 2016

(51) Int. Cl.
*B64D 27/10* (2006.01)
*F01D 11/00* (2006.01)
*F01D 25/18* (2006.01)

(52) U.S. Cl.
CPC ............ *B64D 27/10* (2013.01); *F01D 11/003* (2013.01); *F01D 25/186* (2013.01); *F05D 2300/224* (2013.01)

(58) Field of Classification Search
CPC ...... F01D 25/16; F01D 25/162; F01D 25/166; F01D 11/04; F04D 29/046; F04D 29/056; F04D 29/083; F04D 29/102; F04D 29/161; F04D 29/10; F04D 29/16; F04D 29/162; F04D 29/164; F16J 15/164447; F16J 15/4472; F16J 15/4474; F16J 15/164; F16J 15/447
USPC .............. 277/482, 544; 415/110, 111, 171.1, 415/173.5
See application file for complete search history.

(56) References Cited

U.S. PATENT DOCUMENTS

| 3,106,369 | A | * | 10/1963 | Borst | ........................ | B64C 9/38 244/52 |
| 4,118,997 | A | * | 10/1978 | Woodward | .............. | F01D 15/12 74/417 |
| 5,301,957 | A | * | 4/1994 | Hwang | ................... | F16C 33/76 277/350 |
| 5,722,778 | A | | 3/1998 | Kishikawa et al. | | |
| 5,813,830 | A | * | 9/1998 | Smith | .................... | F16J 15/442 277/349 |

(Continued)

FOREIGN PATENT DOCUMENTS

EP 2657464 10/2013

*Primary Examiner* — Woody Lee, Jr.
*Assistant Examiner* — Hoon Choi
(74) *Attorney, Agent, or Firm* — Norton Rose Fulbright Canada LLP

(57) ABSTRACT

A seal assembly for a bearing assembly in a gas turbine engine includes a first annular runner disposed around a shaft rotatable about an axis defining an axial direction. The first annular runner is rotatable with the shaft about the axis. A seal element is spaced apart from the first annular runner and cooperating therewith to provide a gap seal. An annular lip axially extends from the gap seal to an open end. The lip is disposed at least partially around the seal runner. A second annular runner is disposed coaxially with and spaced radially apart from the lip. The second annular runner extends axially opposite to the lip so as to provide a tortuous path leading to the open end of the lip. A restrictor extends between the lip and the second annular runner to impede the passage oil through the tortuous path to the open end of the lip.

19 Claims, 4 Drawing Sheets

(56) References Cited

U.S. PATENT DOCUMENTS

| | | | |
|---|---|---|---|
| 5,823,470 A * | 10/1998 | Craig | B64C 29/0033 244/60 |
| 7,175,388 B2 * | 2/2007 | Labbe | F01D 11/003 415/174.5 |
| 7,287,384 B2 | 10/2007 | Fish et al. | |
| 7,430,802 B2 * | 10/2008 | Tiemann | F01D 5/3015 29/889.22 |
| 8,210,316 B2 | 7/2012 | DiBenedetto et al. | |
| 9,353,647 B2 | 5/2016 | Anstead | |
| 9,429,037 B2 | 8/2016 | Sidney | |
| 9,567,908 B2 | 2/2017 | Anstead | |
| 2006/0123795 A1 * | 6/2006 | Fish | F01D 25/183 60/772 |
| 2013/0283757 A1 * | 10/2013 | Bordne | F02C 7/06 60/39.08 |
| 2016/0032771 A1 * | 2/2016 | Vdoviak, Jr. | F02C 7/06 277/358 |
| 2016/0040544 A1 | 2/2016 | Desjardins | |

* cited by examiner

SEAL ASSEMBLY FOR A BEARING ASSEMBLY IN A GAS TURBINE ENGINE

TECHNICAL FIELD

The application relates generally to bearing chambers and, more particularly, to seals of bearing chambers.

BACKGROUND OF THE ART

Bearing chambers are sealed so that oil from bearing cavity is contained inside the oil system by mean of pressurized air and controlled gap carbon element. The pressure differential is calculated to stay positive relative to the bearing chamber so that the air flows into the bearing cavity under all operating conditions. When the engine is shut down, pressure from both sides reduces, and oil inside the bearing chamber tends to go down under gravity effect. The shaft and seal runner may become wet, and oil on the surface may seep by capillarity into the seal controlled gap to the air side of the seal element. The leakage of oil has been conventionally addressed by mean of a dripping groove on the runner outside diameter and in front of the sealing element. However, this feature becomes useless in vertically oriented engines when the shaft slope is pointing upward as opposed to conventional horizontal position.

SUMMARY

In one aspect, there is provided a seal assembly for a bearing assembly in a gas turbine engine, the seal assembly comprising: a first annular runner disposed around a shaft rotatable about an axis defining an axial direction, the first annular runner rotatable with the shaft about the axis; a seal element spaced apart from the first annular runner and cooperating therewith to provide a gap seal; an annular lip axially extending from the gap seal to an open end, the lip disposed at least partially around the seal runner; a second annular runner disposed coaxially with and spaced radially apart from the lip, the second annular runner extending axially opposite to the lip so as to provide a tortuous path leading to the open end of the lip; and a restrictor extending between the lip and the second annular runner to impede the passage oil through the tortuous path to the open end of the lip.

In another aspect, there is provided an aircraft tilt-rotor gas turbine engine assembly moveable between a horizontal operating position where a centerline of the engine is aligned to the body centerline of the aircraft, and a vertical operating position where the centerline of the engine is transverse to the body centerline of the aircraft, the gas turbine comprising: a bearing disposed around a rotating shaft, the shaft defining an axial direction; an annular bearing chamber surrounding the bearing, the bearing chamber including: an annular bearing cavity having a reservoir; and an annular seal assembly disposed around the shaft, the seal assembly being axially offset from the reservoir of the bearing cavity, the seal assembly sealing the bearing chamber whether the engine is in the vertical position, in the horizontal position, or a position in between.

DESCRIPTION OF THE DRAWINGS

Reference is now made to the accompanying figures in which.

DETAILED DESCRIPTION

Throughout this description, references will be made to vertical and horizontal orientations of an aircraft engine. These references are made relative to a centerline of body of the aircraft (not shown). An engine of the aircraft may be positioned horizontally (i.e. aligned with the body of the aircraft) or vertically (i.e. transverse to the body of the aircraft). While the words "horizontal" and "vertical" are used throughout, one should understand that these terms are not intended to describe strict vertical and horizontal positions but rather to encompass generally vertical and generally horizontal positions.

Figure 1:
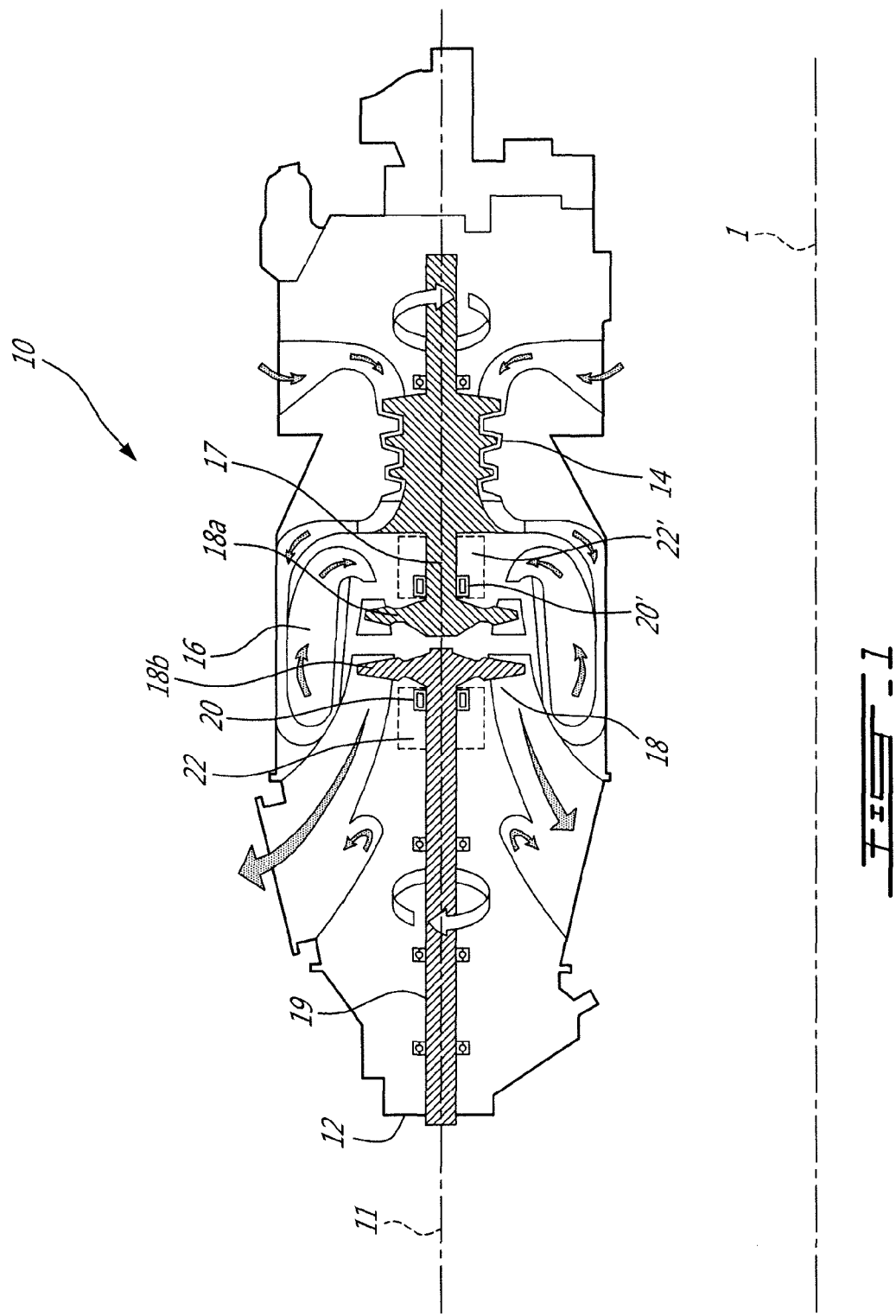
FIG. 1 is a schematic cross-sectional view of a gas turbine engine shown in a horizontal position.

FIG. 1 illustrates a tilt-rotor gas turbine engine 10 of an aircraft (not shown) a type preferably provided for use in subsonic flight, generally comprising in serial flow communication along an engine axis 11, a compressor section 14 for pressurizing the air, a combustor 16 in which the compressed air is mixed with fuel and ignited for generating an annular stream of hot combustion gases, a turbine section 18 for extracting energy from the combustion gases, and an output section 12 through which mechanical power is delivered. The turbine section 18 includes a compressor turbine 18a and a power turbine 18b. A turbine shaft 17 connects the compressor turbine 18a to the compressor section 14. A power shaft 19 transmits power, generated by the compressor section 14 and combustor 16, extracted by the power turbine 18b to the output section 12. The tilt-rotor gas turbine engine 10 can be used in the horizontal position (i.e. engine axis 11 is aligned with a centerline 1 of a body of the aircraft) as a conventional turbopropeller aircraft, as shown in FIG. 1, or can be used in the vertical position (i.e. engine axis 11 is at 90 degrees with the centerline of the body of the aircraft) as a helicopter aircraft.

The tilt-rotor gas turbine engine 10 includes a plurality of bearings 20, 20' on the turbine shaft 17 and on the power shaft 19. The bearings 20, 20' are lubricated in an annular bearing chamber 22, 22' by a lubrication system (not shown). Although two bearings 20, 20' and associated bearing chambers 22, 22' are shown in FIG. 1, it is contemplated that the engine 10 could have only one or more than one bearing chamber, as described below. Whether the engine 10 is the horizontal position, in the vertical position or a position in between, the bearing chamber 22 or 22' may be sealed so that oil contained in the bearing chamber 22 or 22 for lubrication purposes remains within the lubrication system.

Figure 2:
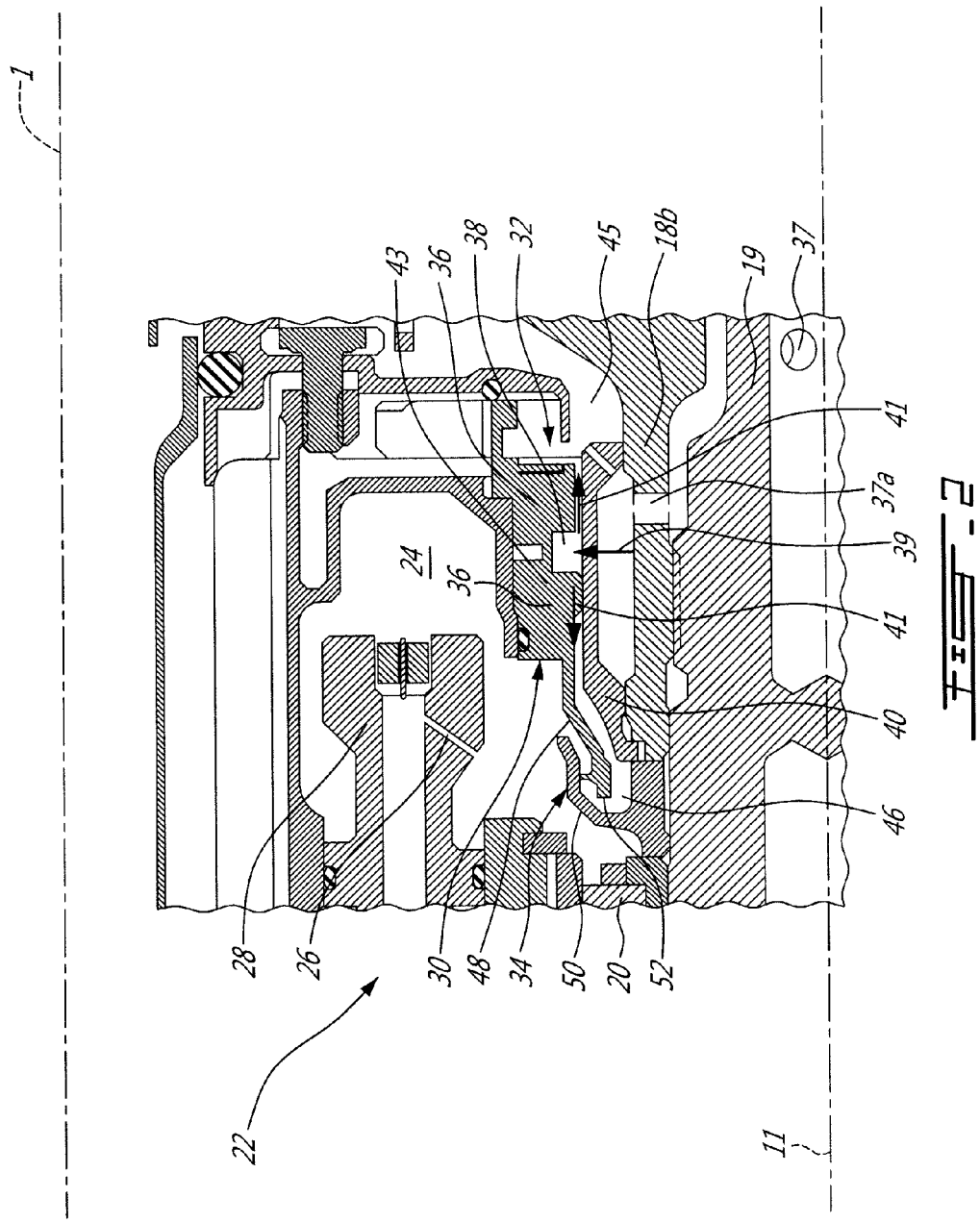
FIG. 2 is a bearing assembly of the engine of FIG. 1 shown in a horizontal position.
Figure 3:
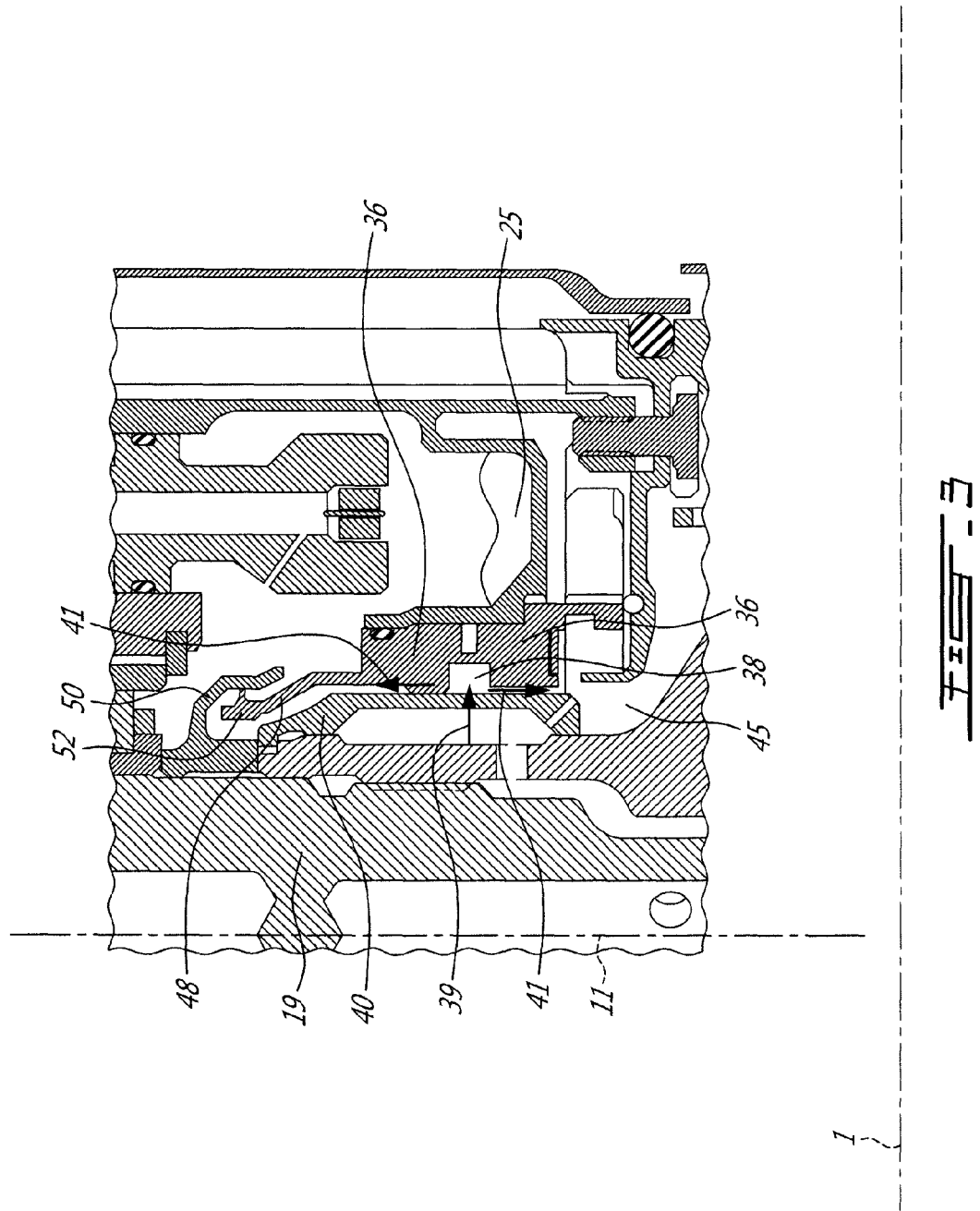
FIG. 3 is the bearing of FIG. 2, shown in a vertical position when the gas turbine engine is in a vertical position.
Figure 4:
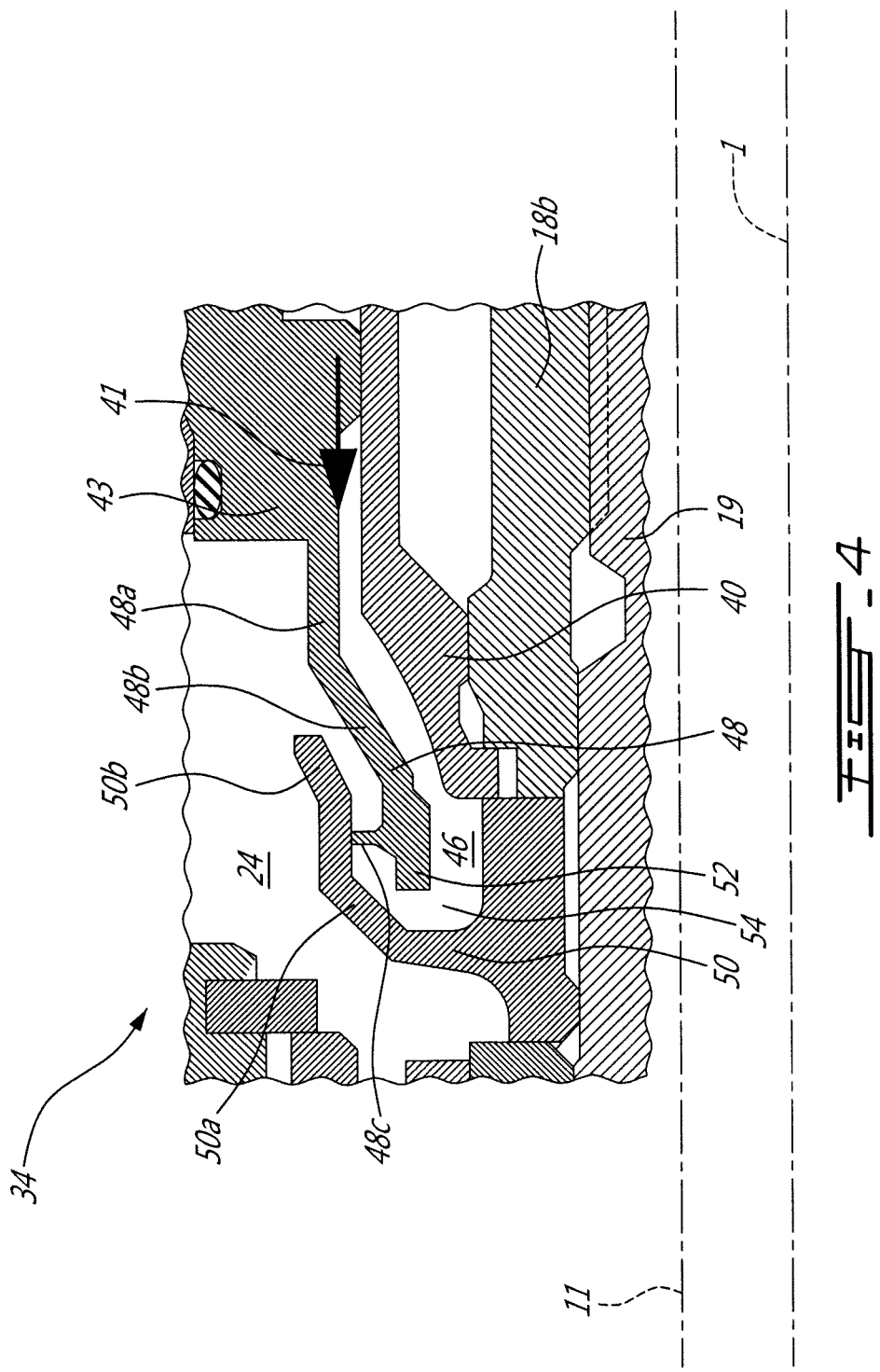
FIG. 4 is a close up view on a sealing assembly for the bearing assembly of FIG. 2.

Turning now to FIGS. 2 to 4, an example of the bearing chamber 22 accommodating the engine 10 in the horizontal position (FIG. 2) and the vertical (FIG. 3) position will now be described. FIGS. 2 to 4 show cross-sections of a portion of the bearing chamber 22 which is annular in nature. While the bearing chamber 22 described below is associated with the bearing 20 of the power turbine 18b of the turbine section 18, it is contemplated that the bearing chamber 22 could be adapted to the bearing 20' associated with the compressor turbine 18a of the turbine section 18 and to shafts other than the power shaft 19 (for example the turbine shaft 17).

The bearing chamber 22 includes a bearing cavity 24 containing liquid lubrication oil, and emulsified or mist form thereof. As best seen in FIG. 3, the bearing cavity 24 is shaped to act as a reservoir containing an oil sump volume 25 when the engine 10 is in the vertical position. Oil is carried through an oil tube 28 to the bearing cavity 24 via a jet channel 26 defined in the oil tube 28. Pressurised air is carried from the compressor section 14 to the bearing cavity 24 of the oil of the bearing cavity 24 to pass through it. An annular seal assembly 30 proximate to the shaft 19 is designed to allow some of the pressurized air to penetrate into the bearing cavity 24 without letting the oil leak therethrough, whether the engine 10 is in the vertical or horizontal position.

The seal assembly 30 includes a seal element in the shape of an annular dual controlled gap carbon seal 32, in series with an annular oil sealing assembly 34. The dual controlled gap carbon seal 32 includes two static controlled gap carbon seals 36 disposed adjacent to each other and separated by a first chamber 38. The first chamber 38 receives the pressurised air carried sequentially through holes 37 defined in the shaft 19 and through holes 37a in a power turbine stub portion of the turbine 18b. The pressurised air is delivered only when the engine 10 is on. The controlled gap carbon seals 36 are spaced apart, disposed closely (yet not abutting), to a rotating annular first runner 40. The controlled gap carbon seals 36 cooperate with the first runner 40 to provide a gap seal 43. The first runner 40 also includes holes to carry the pressurized air 39 from the power turbine 18b to the first chamber 38. The first runner 40 rotates with the power turbine 18b in the axial direction defined by the shaft 19. In normal operation conditions, pressurised air in the first chamber 38 escapes through a space defined between the controlled gap carbon seals 36 and the first runner 40 (see arrows 41). Some of the air escapes toward a cavity 45 of the power turbine 18b, while some toward a second chamber 46 formed by the sealing assembly 34. The air being forced in a direction of the sealing assembly 34 creates a static pressure in the second chamber 46 which prevents oil from getting into the sealing assembly 34, so that it remains in the bearing cavity 24 for lubrication of, among other things, the bearing 20.

Referring more specifically to FIG. 4, which is a close-up view of the sealing assembly 34 of FIG. 2, the sealing assembly 34 is designed to prevent oil from getting through it whether the engine 10 is in horizontal or vertical position. The sealing assembly 34 includes an annular axial lip or extension 48 of the dual controlled gap carbon seal 32, and an annular second runner 50 covering an open end 52 of the lip 48. The lip 48 is disposed around the second runner 50. In this example, the second runner 50 has a somewhat arcuate shape, though any suitable shape may be employed. The lip 48 axially extends from the gap seal 43 to the open end 52. The second runner 50 extends axially opposite to the lip 48 so as to provide a tortuous path 54 leading to the open end 52 of the lip 48. In the illustrated embodiment, the second runner 50 is disposed coaxially with and spaced radially apart from the lip 48.

The second runner 50 rotates with the shaft 19 in the axial direction defined by the shaft 19. The second runner 50 is disposed axially adjacent to the first runner 40 so as to form a continuity with the first runner 40. The position and shape of the lip 48 may prevent some of the oil or oil mist of the bearing cavity 24 to escape through it when the engine 10 is in the horizontal position, while the position and shape of the second runner 50 may prevent some of the oil or oil mist of the bearing cavity 24 to escape through it when the engine 10 is in the vertical position. The lip 48 could be more or less long than shown in the Figures. The lip 48 and second runner 50 may both be made of steel to resist to loads and vibration.

The lip 48, in one non-limiting embodiment, includes a generally axially extending first portion 48a disposed generally in alignment with a generally axially extending portion of the first runner 40 and of the flow of pressurised air 41. The lip 48 includes a second portion 48b extending from the first portion 48a and converging radially relative to the shaft 19 and oriented to be generally parallel to the first runner 40. The lip 48 creates with the first runner 40 a channel to the pressurized air. The second portion 48b includes a restrictor disposed close to the second runner 50 at the open end 52 so as to create a constriction there. The restrictor 48c impedes the passage oil through the tortuous path 54 to the open end 52 of the lip 48.

When the engine 10 is in the vertical position (as in FIG. 3), the presence of the second portion 48b places the restrictor 48c further upwards relative to the oil sump 25 to prevent oil from the oil sump 25 to reach the restrictor 48c when the oil sump volume 25 is high. As such, when the engine 10 is in the vertical position, the sealing assembly 34 is vertically disposed above the oil sump 25 in normal operating conditions. When the engine 10 is in the horizontal position, the constriction provided by the restrictor 48c also reduces an amount of oil which may penetrate between the first and second oil slingers 48, 50 when the engine 10 is off, and the pressurised air is not delivered to the sealing assembly 34. Other types of restrictors not involving the restrictor 48c are contemplated.

The second runner 50 has a first generally arcuate portion 50a shaped to provide a closure to a channel defined between the second portion 48b of the lip 48 and the first runner 40, and a second portion 50b extending from the first portion 50a. The second portion 50a is disposed generally parallel to the second portion 48b of the lip 48. The second portion 50b extends axially beyond the restrictor 48c and acts as a shield for preventing the oil or oil mist to reach the dual controlled gap carbon seal 32 when the engine 10 is in the horizontal position.

The arcuate configuration of the second runner 50 forces the pressurized air to perform a U-turn at the open end 52. At the exit of the sealing assembly 34, the pressurised air is expelled toward the bearing cavity 24, thereby pushing away eventual oil mist moving towards the sealing assembly 34.

It is contemplated that the runners 48, 50 could have various shape. For example, the second runner 50 could include the restrictor 48c instead of the lip 48. The restrictor 48c could also be omitted. In another example, the second runner 50 could be substantially straight and the lip 48 could have an arcuate portion shaped to provide a closure to the channel defined between the second runner 50 and the lip 48. In yet another example, the second portion 50b of the second runner 50 could be omitted.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A seal assembly for a bearing assembly in a gas turbine engine, the seal assembly comprising:
   an annular runner including a first annular runner portion and a second annular runner portion, the annular runner disposed around a shaft rotatable about an axis defining an axial direction, the annular runner rotatable with the shaft about the axis;

a seal element axially aligned with, radially superposed with and radially spaced apart from the first annular runner portion and cooperating therewith to provide a gap seal axially aligned with the seal element and the first annular runner portion;

an annular lip axially extending from the gap seal to an open end, the annular lip disposed at least partially around the annular runner;

the second annular runner portion axially extending from the first annular runner portion and disposed coaxially with and spaced radially apart from the annular lip, the second annular runner portion extending axially opposite to the annular lip so as to provide a tortuous path leading to the open end of the annular lip; and a restrictor extending between the annular lip and the second annular runner portion to impede a passage of oil through the tortuous path to the open end of the annular lip.

2. The seal assembly of claim 1, wherein the second annular runner portion is disposed radially outwardly of the annular lip.

3. The seal assembly of claim 1, wherein the annular lip extends generally parallel to the first annular runner portion.

4. The seal assembly of claim 1, wherein the restrictor is a lip portion extending generally radially from the annular lip of the seal assembly toward the second annular runner portion.

5. The seal assembly of claim 1, wherein the restrictor is disposed at the open end of the annular lip of the seal assembly.

6. The seal assembly of claim 1, wherein the second annular runner portion includes an arcuate first portion, and a straight second portion extending from the arcuate first portion.

7. The seal assembly of claim 6, wherein the second portion of the second annular runner portion extends generally parallel to the annular lip.

8. The seal assembly of claim 6, wherein the restrictor is a lip portion extending radially from the annular lip toward the first portion of the second annular runner portion.

9. The seal assembly of claim 1, wherein the gap seal is a dual controlled gap carbon seal directing pressurised air toward a pressurized air chamber, the dual controlled gap carbon seal being connected to an end of the annular lip opposite to the open end.

10. The seal assembly of claim 1, wherein the restrictor and the second annular runner define a pressurized air chamber.

11. A tilt-rotor gas turbine engine comprising the seal assembly of claim 1, the engine rotatable between a horizontal and a vertical position, and wherein the second annular runner portion extends towards a lower end of the gas turbine engine when it is in the vertical position.

12. An aircraft tilt-rotor gas turbine engine assembly moveable between a horizontal operating position where a centerline of the engine is aligned to the body centerline of the aircraft, and a vertical operating position where the centerline of the engine is transverse to a centerline of the body of the aircraft, the gas turbine comprising:

a bearing disposed around a rotating shaft, the shaft defining an axial direction;

an annular bearing chamber incorporating the bearing, the annular bearing chamber including:

an annular bearing cavity being a reservoir; and an annular seal assembly disposed around the shaft, the seal assembly opening into the reservoir of the bearing cavity, the seal assembly sealing an annular space between the reservoir of the annular bearing chamber and the rotating shaft whether the engine is in the vertical position, in the horizontal position, or a position in between.

13. The gas turbine engine of claim 12, wherein the seal assembly includes an annular lip extending from a seal element and spaced apart from an annular runner, an annular arcuate runner disposed around the annular lip, and a restrictor disposed between the annular lip and the annular arcuate runner, the seal element cooperating with the annular runner to provide a gap seal, the annular lip and the annular arcuate runner defining a pressurised air chamber preventing oil to leak from the bearing cavity.

14. The gas turbine engine of claim 13, wherein the gap seal is a dual controlled gap carbon seal directing pressurised air toward the pressurized air chamber, the dual controlled gap carbon seal being connected to an end of the annular lip.

15. The gas turbine engine of claim 14, wherein the dual controlled gap carbon seal includes a first chamber, and the pressurized air chamber is a second chamber.

16. The gas turbine engine of claim 13, wherein the annular lip extends generally parallel to the annular runner.

17. The gas turbine engine of claim 13, wherein the annular lip includes a first portion extending generally axially, and a second portion extending from the first portion and converging axially.

18. The gas turbine engine of claim 13, wherein the restrictor is a lip extending radially from the annular lip toward the annular arcuate runner.

19. The gas turbine engine of claim 13, wherein the restrictor is disposed at an open end of the annular lip.

* * * * *